(12) United States Patent  
Kang et al.

(10) Patent No.: US 11,448,874 B2
(45) Date of Patent: Sep. 20, 2022

(54) METHOD AND APPARATUS FOR CORRECTION OF ABERRATION

(71) Applicants: SAMSUNG ELECTRONICS CO., LTD., Suwon-si (KR); SEOUL NATIONAL UNIVERSITY (SNU) R&DB FOUNDATION, Seoul (KR)

(72) Inventors: Deokyoung Kang, Suwon-si (KR); Myung Joo Kang, Seoul (KR); Yang Ho Cho, Seongnam-si (KR); Seung Won Jeong, Seoul (KR); Jin Je Park, Seoul (KR)

(73) Assignees: SAMSUNG ELECTRONICS CO., LTD., Suwon-si (KR); SNU R&DB FOUNDATION, Seoul (KR)

( * ) Notice: Subject to any disclaimer, the term of this patent is extended or adjusted under 35 U.S.C. 154(b) by 349 days.

(21) Appl. No.: 16/838,231

(22) Filed: Apr. 2, 2020

(65) Prior Publication Data

US 2021/0116705 A1   Apr. 22, 2021

(30) Foreign Application Priority Data

Oct. 18, 2019   (KR) .................. 10-2019-0130196

(51) Int. Cl.
*H04N 5/225*   (2006.01)
*H04N 5/357*   (2011.01)
(Continued)

(52) U.S. Cl.
CPC ....... *G02B 27/0025* (2013.01); *H04N 5/2254* (2013.01); *G02B 13/0085* (2013.01)

(58) Field of Classification Search
None
See application file for complete search history.

(56) References Cited

U.S. PATENT DOCUMENTS

| 10,187,627 B2 | 1/2019 | Cho et al. |
| 2018/0124321 A1* | 5/2018 | Hayasaka .......... H04N 5/23212 |
| 2018/0152692 A1 | 5/2018 | Cho et al. |

FOREIGN PATENT DOCUMENTS

| CN | 105005975 B | 6/2018 |
| JP | 2012-5056 A | 1/2012 |

(Continued)

OTHER PUBLICATIONS

Zhang et al., "Restoration of Radially Blurred Image Created by Spherical Single Lens System of Cell Phone Camera", IEEE Sensors 2010 Conference, 2010, pp. 1333-1337, 5 pages total.

(Continued)

*Primary Examiner* — Mark T Monk
(74) *Attorney, Agent, or Firm* — Sughrue Mion, PLLC

(57) ABSTRACT

An aberration correction method and apparatus. The apparatus includes at least one processor, and an input/output unit configured to receive an captured image, wherein the processor is configured to initialize a first matrix or a second matrix by reducing a matrix of a point spread function (PSF) of a lens included in a capturing device used to capture the captured image, iteratively perform an aberration removal and a noise removal based on the captured image and the first matrix or the second matrix, and output a final original image as a result of the iteratively performing. Here, the first matrix is a matrix obtained by reducing the number of indices indicating light arrival points of the matrix of the PSF, and the second matrix is a matrix obtained by reducing the number of indices corresponding to light arrival points of a transposed matrix of the PSF.

12 Claims, 22 Drawing Sheets

(51) Int. Cl.
*H04N 9/04* (2006.01)
*G06T 5/00* (2006.01)
*G02B 27/00* (2006.01)
*G02B 13/00* (2006.01)

(56) References Cited

FOREIGN PATENT DOCUMENTS

| KR | 10-2015-0128510 A | 11/2015 |
| KR | 10-2018-0020565 A | 2/2018 |
| KR | 10-1900200 B1 | 11/2018 |

OTHER PUBLICATIONS

Heide et al., "High-Quality Computational Imaging Through Simple Lenses", ACM Transactions on Graphics, 2013, pp. 1-13, 13 pages total.
Combettes et al., "Signal Recovery By Proximal Forward-Backward Splitting", Multiscale Model. Simul, 2005, pp. 1-33, 33 pages total.

* cited by examiner

FIG. 5B
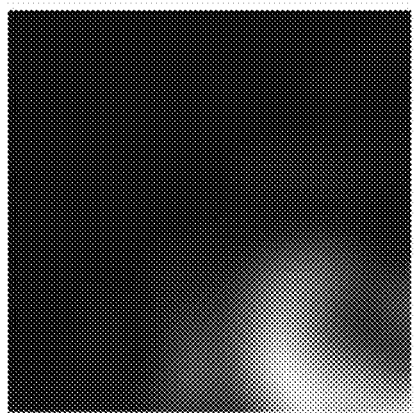  

METHOD AND APPARATUS FOR CORRECTION OF ABERRATION

CROSS-REFERENCE TO RELATED APPLICATION

This application claims priority from Korean Patent Application No. 10-2019-0130196, filed on Oct. 18, 2019 in the Korean Intellectual Property Office, the disclosure of which is incorporated herein by reference in its entirety.

BACKGROUND

1. Field

Methods and apparatuses consistent with exemplary embodiments relate to correcting an aberration, and more particularly, to separately performing an aberration correction and a noise removal through a posteriori probability.

2. Description of the Related Art

An aberration is a phenomenon in which an unintended color or a shape distortion occurs when light irradiated from a light start point does not converge exactly into a single light arrival point after passing through an optical system. The aberration includes a monochromatic aberration and a chromatic aberration. The chromatic aberration results from the dispersion characteristics of a medium of a lens, and the monochromatic aberration results from the geometrical shape of a lens or a mirror irrespective of dispersion and includes a spherical aberration, a comatic aberration, an astigmatism, a curvature aberration, and a distortion aberration. An aberration correction refers to an operation of restoring an original image by correcting a portion distorted by an aberration in an observed image.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an aberration correction method, including: receiving a captured image that is captured by a camera; generating a first matrix based on a point spread function (PSF) matrix of a lens of the camera by reducing a number of indices indicating light arrival points of the PSF matrix, or generating a second matrix based on the PSF matrix by reducing a number of indices corresponding to light arrival points of a transposed matrix of the PSF matrix; iteratively performing an aberration removal and a noise removal based on the captured image, and the first matrix or the second matrix; and outputting a final corrected image as a result of the iteratively performing the aberration removal and the noise removal.

A PSF of the PSF matrix may indicate an output intensity of light reaching a light arrival point with respect to an input intensity of light incident to a light start point, wherein the generating the first matrix or the second matrix may include: calculating a distance from a predetermined light start point to a light arrival point at which an output intensity of light exceeds a threshold; and generating the first matrix or the second matrix by reducing the number of indices indicating the light arrival points based on the distance and the PSF matrix.

The threshold is zero.

The generating the first matrix or the second matrix may further include outputting a transformed first matrix or a transformed second matrix by exchanging the indices indicating light start points and the indices indicating the light arrival points, with respect to the first matrix or the second matrix.

The iteratively performing may include: performing the aberration removal by computing an auxiliary image of a current stage based on a final corrected image of a previous stage; performing the noise removal by computing an intermediate corrected image of the current stage based on the auxiliary image of the current stage; and determining whether the intermediate corrected image of the current stage and the final corrected image of the previous stage converge.

The performing the aberration removal may include performing the aberration removal by computing the auxiliary image of the current stage based on the final corrected image of the previous stage, the captured image, the first matrix, the second matrix, and a first parameter.

The performing the noise removal may include performing the noise removal by computing the intermediate corrected image of the current stage based on the auxiliary image of the current stage, a first parameter, a second parameter, and a regularizer.

The determining may include whether the intermediate corrected image of the current stage and the final corrected image of the previous stage converge: determining whether a difference between the intermediate corrected image of the current stage and the final corrected image of the previous stage is less than a threshold; and terminating the iteratively performing in response to the difference being less than the threshold.

According to an aspect of another exemplary embodiment, there is provided a non-transitory computer-readable storage medium storing instructions that, when executed by a processor, cause the processor to perform the aberration correction method.

According to an aspect of another exemplary embodiment, there is provided an aberration correction apparatus, including: at least one processor; and an input/output (I/O) unit, wherein the I/O unit is configured to receive a captured image, and the least one processor is configured to: generate a first matrix based on a point spread function (PSF) matrix of a lens of the camera by reducing a number of indices indicating light arrival points of the PSF matrix, or generate a second matrix based on the PSF matrix by reducing a number of indices corresponding to light arrival points of a transposed matrix of the PSF matrix, iteratively perform an aberration removal and a noise removal based on the captured image, and the first matrix or the second matrix, and output a final original image as a result of the iteratively performing the aberration removal and the noise removal.

A PSF of the PSF matrix may indicate an output intensity of light reaching a light arrival point with respect to an input intensity of light incident to a light start point, and wherein the processor may be further configured to: calculate a distance from a predetermined light start point to a light arrival point at which an output intensity of light exceeds a threshold, and generate the first matrix or the second matrix by reducing the number of indices indicating the light arrival points based on the distance and the PSF matrix.

The processor may be further configured to output a transformed first matrix or a transformed second matrix by exchanging the indices indicating light start points and the indices indicating the light arrival points, with respect to the first matrix or the second matrix.

BRIEF DESCRIPTION OF THE DRAWINGS

The above and/or other aspects will be more apparent by describing certain exemplary embodiments with reference to the accompanying drawings, in which:

FIG. 5B illustrates a first matrix including indices transformed using an aberration correction method according to an exemplary embodiment and an example of performing a component-wise product with respect to an original image to which an offset is applied;

DETAILED DESCRIPTION

Figure 1:
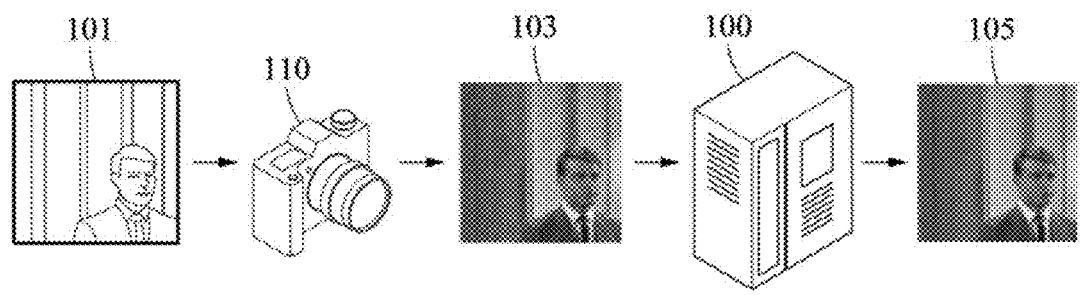
FIG. 1 illustrates an example of performing an aberration correction by an aberration correction apparatus according to an exemplary embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The following detailed structural or functional description is provided as an example only and various alterations and modifications may be made to the exemplary embodiments. Accordingly, the exemplary embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Meanwhile, in some alternative implementations, functions or operations specified in predetermined blocks may be performed in an order different from that shown in a flowchart. For example, two successive blocks may be performed substantially concurrently in practice or may be performed in a reverse order depending upon the related functions or operations.

Hereinafter, exemplary embodiments will be described in detail with reference to the accompanying drawings. Like reference numerals in the drawings denote like elements, and thus their description will be omitted.

FIG. 1 illustrates an example of performing an aberration correction by an aberration correction apparatus according to an exemplary embodiment.

Referring to FIG. 1, an image of an object 101 may be captured by an optical device 110. The optical device 110 may a camera that includes a lens. An observed image 103 that is captured by the optical device 110 to be output to a display screen may be distorted due to the characteristics of the optical device 110. An aberration correction apparatus 100 may obtain a final original image 105 by performing an aberration correction on the observed image 103. Here, the final original image 105 may be an image obtained by alleviating or removing distortions in the observed image 103, and may be also referred to as a corrected image.

The aberration correction apparatus 100 may acquire the final original image 105 from the observed image 103 by reducing or removing noise and correcting an optical aberration. The aberration correction apparatus 100 may accurately restore the final original image 105 or generate the corrected image by performing an aberration removal and a noise removal using a maximum a posteriori probability (MAP). The aberration correction apparatus 100 may reduce computing resources by reducing the number of indices of a matrix indicating an optical aberration of the optical device. The aberration correction apparatus 100 may perform the aberration correction more quickly by implementing vector parallelization by transforming the indices of the matrix indicating the optical aberration of the optical device.

The aberration correction apparatus 100 may be used for a lens aberration correction of a compound eye vision (CEV) system using a multi-lens matrix. The aberration correction apparatus 100 may be used for the entire process of restoring the final original image 105 by the CEV system. The aberration correction apparatus 100 may also be used for a lens aberration correction of a single eye vision system. The aberration correction apparatus 100 may also be used to a system including an optical lens, such as a telescope or a microscope.

The aberration correction apparatus 100 may be mounted on an optical device such as a mobile phone camera or a digital camera. If the optical characteristics of a predetermined optical device are specified, the aberration correction apparatus 100 may perform an aberration correction within the optical device using the optical characteristics or may be implemented in the form of a separate external device. The aberration correction apparatus 100 may be implemented in the form of a separate chipset such as an application-specific integrated circuit (ASIC) chip or a field-programmable gate array (FPGA) chip.

A point spread function (PSF) used for an aberration correction may be a function that indicates a dispersion of light incident to a light start point, and is one of the characteristics of a lens. An aberration occurring due to the characteristics of a lens may be expressed through the PSF. If an original image of an N×N resolution is denoted as I, an observed image S deteriorated by the PSF indicating a characteristic of the lens may be expressed by Equation 1. Hereinafter, an original image may be a variable storing a result of restoration from the observed image by being iteratively updated, and a last updated original image may be a final original image. The original image may be referred to as an intermediate corrected image, and the final original image may be referred to as a final corrected image. An image with no or little distortion caused by an aberration will be referred to as a reference image. The reference image may be prepared in advance and used for a testing process.

$$S(x) = \sum_{y \in \Omega} PSF(y, x) I(x) \quad \text{[Equation 1]}$$

In Equation 1, $\Omega$ denotes a pixel domain of an image and includes N×N pixels. x and y respectively denote a position of a light start point and a position of a light arrival point in the domain. Different distortions may occur depending on the positions of the light start point and the light arrival point in the image, and thus in principle, values of a PSF for all pairs of light start points and light arrival points may be needed. Since a light start point includes N×N pixels and a light arrival point includes N×N pixels, the size or the computational complexity of a storage space for storing the values of the PSF with respect to all pairs may be $N^4$. As described above, a plenty of computing resources may be needed to store and calculate distortion information with respect to all the pairs.

Assuming that the original image I and the observed image S are $N^2$-dimensional vectors, information of the PSF may be stored in a matrix M with the $N^2 \times N^2$ size. In this example, the original image I and the observed image S may have a relationship as expressed by Equation 2.

$$S_i = \sum_{1 \leq j \leq N^2} M_{j,i} I_j \quad \text{[Equation 2]}$$

A least square method may be used to obtain I, which may be the same as obtaining the solution I of Equation 3.

$$M^T(MI-S)=0 \quad \text{[Equation 3]}$$

In Equation 3, $M^T$ denotes a transposed matrix of M. The solution I to be obtained may be expressed by $I=(M^T M)^{-1} M^T S$, which indicates finding an original image (corrected image) I which is closest to the observed image S in the range of the matrix M, and in which the distance between the MI under the linear transformation M and the observed image (captured image) S is shortest among others. The solution I of Equation 3 may be obtained using various schemes such as, for example, direct computation, polar coordinate system substitution, piecewise convolution.

The direct computation uses the matrix M to obtain I. The direct computation uses the matrix M requiring the storage space and the complexity of $N^4$ and thus requires a high computing cost. A million-pixel image requires a storage space of $4 \times 1000^4 = 3725$ GB to store the matrix M. Further, calculation of a simple product of the matrix and an inverse matrix of $M^T \times M$ requires a significantly great storage space and a significantly high calculating cost. The direct computation optimizes Equation 3 and thus, has a noise-sensitive characteristic. If the observed image S includes noise, the restored final original image I may greatly differ from the reference image or an actual object.

The polar coordinate system substitution is a scheme of modeling an aberration with a convolution in a polar coordinate system using the symmetry of a lens. To use the polar coordinate system substitution, an optical device should have a symmetry. However, if a CEV camera is used, images passing through a number of lenses are present in a single image, and thus a radial symmetry is not established. Further, an interpolation is used in the substitution process using the polar coordinate system, and thus approximation errors may occur.

The piecewise convolution is a scheme of modeling an aberration with a convolution in a piece region using an assumption that a PSF is constant in a small piece region of an image. However, the piecewise convolution may not be appropriate for a CEV image in which a change in the PSF is great or for an image acquired by an optical device such as a microscope including a small lens. As the change in the PSF increases, errors between a final original image restored by the piecewise convolution and a reference image or an actual object increase greatly.

On the contrary, the aberration correction apparatus 100 may improve the performance and rate of restoring the final original image 105 and effectively remove noise from the observed image 103. The aberration correction apparatus 100 may perform an aberration removal and a noise removal using a MAP. The aberration correction apparatus 100 may separate the aberration removal and the noise removal. The aberration correction apparatus 100 may iteratively perform the aberration removal and the noise removal. The aberration correction apparatus 100 may determine whether an original image of a previous stage and an original image of a current stage converge, as a result of the iteratively performing. The aberration correction apparatus 100 may output the final original image 105 computed as the result of the performing.

The aberration correction apparatus 100 may separate the aberration removal and the noise removal from an equation induced using the MAP based on operator splitting. The aberration correction apparatus 100 may alternately and iteratively perform the aberration removal and the noise removal. The aberration correction apparatus 100 may compare the original image of the previous stage and the original image of the current stage for each iteration. The aberration correction apparatus 100 may determine whether the two original images converge. For example, the aberration correction apparatus 100 may determine whether a difference between the two original images is less than a threshold. In response to a determination that the two original images do not converge, the aberration correction apparatus 100 may iteratively perform the aberration removal and the noise removal. In response to a determination that the two original images converge, the aberration correction apparatus 100 may terminate the iteratively performing and output a final original image.

The aberration correction apparatus 100 may derive Equation 4 using a MAP that maximizes a posteriori probability of observation values by assuming the distribution of a prior probability for the noise removal left when the aberration removal is performed. The aberration correction apparatus 100 may introduce a regularizer to Equation 4. In Equation 4, J denotes the regularizer, and μ denotes a regularization parameter.

$$\text{minimize}_I(\mu J(I) + \frac{1}{2}\|MI - S\|^2) \quad \text{[Equation 4]}$$

The aberration correction apparatus 100 may split an aberration removal portion and a noise removal portion using operator splitting, thereby more easily calculating the portions and effectively removing noise. The aberration correction apparatus 100 may split Equation 4 into Equation 5 and Equation 6. The aberration correction apparatus 100 may alternately and iteratively calculate Equation 5 and Equation 6. A last updated I may be output as the final original image. The aberration correction apparatus 100 may reduce the noise sensitivity of the restored image by iteratively performing the aberration removal and the noise removal. In Equations 5 and 6, A denotes an auxiliary variable and will be also referred to as an auxiliary image.

$$A^{k+1} = I^k - \delta(M^T M I^k - M^T S) \quad \text{[Equation 5]}$$

$$I^{k+1} = \arg\min_I \delta\mu J(I) + \frac{1}{2}\|I - A^{k+1}\|^2 \quad \text{[Equation 6]}$$

The aberration correction apparatus 100 may reduce the number of indices of a matrix indicating an optical aberration of a lens. The aberration correction apparatus 100 may generate a matrix by reducing a matrix of a PSF of a lens included in a capturing device used to capture the observed image 103, and perform operations for an aberration removal and a noise removal using the generated matrix. By reducing the matrix to be used for the operations to obtain a solution, the aberration correction apparatus 100 may perform the operations more quickly.

According to the direct computation, the size of the matrix M indicating information of the PSF corresponds to $N^4$. The aberration correction apparatus 100 may restrict a maximum radius of the PSF to reduce a computational complexity. Here, the term "radius" will be also referred to as a length or a distance, and an effective region of a light arrival point is not limited to a circular region. Since the value of the PSF is maximized at edges of the observed image 103 S, the aberration correction apparatus 100 may search for a point which is farthest from a predetermined light start point and at which the value of the PSF is not "0", and set a distance to the found point as a maximum radius r. If the image resolution is (N, N), the aberration correction apparatus 100 may generate a four-dimensional (4D) matrix P with the size of (2r+1, 2r+1, N, N). If an index of a light start point is (k, l) and an index of a light arrival point is (i, j), the number of indices of light arrival points may be reduced from $N^2$ to $(2r+1)^2$. If the matrix index starts from "1", the aberration correction apparatus 100 may initialize the matrix P using Equation 7. Hereinafter, the matrix P may be referred to as the second matrix.

$$P(i, j, k, l) = PSF(k, l, k+i-r-1, l+j-r-1) \quad \text{[Equation 7]}$$

$$(M^T I)_{k,l} = \sum_{i,j} P(i, j, k, l) I_{k+i-r-1, l+j-r-1} \quad \text{[Equation 8]}$$

The aberration correction apparatus 100 may calculate an operation of Equation 8 included in Equation 5 using the matrix P, with the computational complexity of $N^2 \times (2r+1)^2$. If r=5, the size of the matrix P may be about 451 megabytes (MB) based on million pixels and correspond to about a nine-thousandth part of 3725 gigabytes (GB), the size of the original matrix M. Similarly, the aberration correction apparatus 100 may initialize a 4D matrix Q of the same size using Equation 9. The aberration correction apparatus 100 may calculate an operation of Equation 10 included in Equation 5 with the computational complexity of $N^2 \times (2r+1)^2$. Hereinafter, the matrix Q may be referred to as the first matrix.

$$Q(i, j, k, l) = \qquad \text{[Equation 9]}$$
$$P(2r+1-i, 2+1-j, k-r-1+i, l-r-1+j)$$

$$(MI)_{k,l} = \sum_{i,j} Q(i, j, k, l) I_{k+i-r-1, l+j-r-1} \qquad \text{[Equation 10]}$$

The aberration correction apparatus 100 may perform an aberration correction more quickly by implementing vector parallelization by transforming the indices of the matrix indicating the optical aberration of the lens. The aberration correction apparatus 100 may exchange indices indicating light start points and indices indicating light arrival points in the first matrix or the second matrix obtained by reducing the number of indices of light arrival points. The aberration correction apparatus 100 may further reduce the computing time of matrix operation using a scheme of performing a component-wise product with respect to a 4D matrix and a vector-parallelized image slice.

If an index of a light start point is (k, l) and an index of a light arrival point is (i, j) in the PSF, the number of indices (k, l) of light start points and the number of indices (i, j) of light arrival points are $N^2$ and $(2r+1)^2$, respectively, with respect to the matrices P and Q. If an iteration with respect to (k, l) is performed after an iteration with respect to (i, j) as shown in Equation 8 and Equation 10, an operation with the complexity of $(2r+1)^2$ is performed after an operation with the complexity of $N^2$ is performed. Since the complexity of an inner iteration is less than the complexity of an outer iteration, such an operation may be inappropriate for a parallel operation.

Conversely, if the indices (k, l) of the light start points and the indices (i, j) of the light arrival points are exchanged by the aberration correction apparatus 100, the complexity of the inner iteration becomes greater than the complexity of the outer iteration with respect to Equation 8 and Equation 10. Such an operation may be appropriate for a parallel operation, and if parallel processing is applied to the operation, the computing speed may increase.

$$\text{Slice}_{i,j} = P(\text{or } Q)(i,j;:) \qquad \text{[Equation 11]}$$

With respect to the matrices P and Q including the exchanged indices, a predetermined (i, j)-th 2D matrix may be defined as a slice as expressed by Equation 11. The slice may have a value at a position (i−r−1, j−r−1) about each point on an image, the value including a weight obtained as a result of an aberration synthesis operation. The size of the slice is equal to $N^2$, the size of the original image I or the observed image 103 S. Accordingly, Equation 8 and Equation 10 may be calculated as the sum of results of performing a component-wise product with respect to matrices obtained by circulating slices and the original image by a position of (i−r−1, j−r−1). The aberration correction apparatus 100 may implement the operation using single instruction multiple data (SIMD) instructions, general-purpose computing on graphics processing units (GPGPU) such as open computing language (OpenCL) or computed unified device architecture (Cuda), or an application programming interface (API). The aberration correction apparatus 100 may maximize the computing speed of the operation through a direct circuit such as a field-programmable gate array (FPGA) or an application-specific integrated circuit (ASIC) chip.

Figure 2:
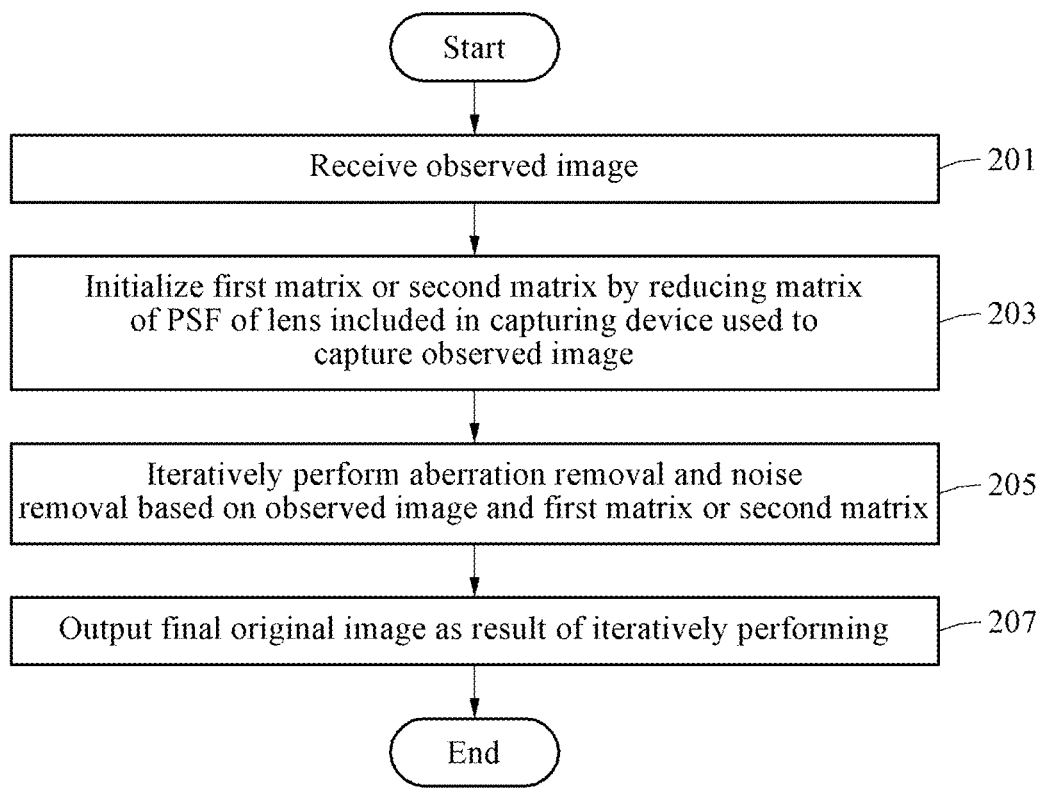
FIG. 2 is a flowchart illustrating operations of an aberration correction method according to an exemplary embodiment.

FIG. 2 is a flowchart illustrating operations of an aberration correction method according to an exemplary embodiment.

Referring to FIG. 2, in operation 201, the aberration correction apparatus 100 may receive an observed image. The observed image may be an image output after an original image passes through an optical device, and include a distortion caused by noise and an aberration of the optical device.

In operation 203, the aberration correction apparatus 100 may generate a first matrix or a second matrix by reducing a matrix of a PSF of a lens included in a capturing device used to capture the observed image. Here, the first matrix may be a matrix obtained by reducing the number of indices indicating light arrival points of the matrix of the PSF, and the second matrix may be a matrix obtained by reducing the number of indices corresponding to light arrival points of a transposed matrix of the PSF. The PSF may indicate an output intensity of light reaching a light arrival point with respect to an input intensity of light incident to a light start point. The aberration correction apparatus 100 may initialize the original image. The original image may be initialized to a preset value or set as an externally received value.

The aberration correction apparatus 100 may calculate a distance from a predetermined light start point to a light arrival point at which an output intensity of light exceeds a threshold. The aberration correction apparatus 100 may output the first matrix or the second matrix by reducing the number of indices indicating the light arrival points based on the distance and the matrix of the PSF. Here, the threshold may be "0".

The aberration correction apparatus 100 may output a transformed first matrix or a transformed second matrix by exchanging the indices indicating the light start points and the indices indicating the light arrival points, with respect to the first matrix or the second matrix including the reduced indices. Through this, an iteration with respect to the indices indicating the light start points may be performed first, and then, an iteration with respect to the indices indicating the light arrival points may be performed. Since the iteration count with respect to the indices indicating the light start points is greater than the iteration count with respect to the indices indicating the light arrival points, a component-wise product between the original image and the first matrix or the second matrix may be processed faster by parallel processing, than the opposite case.

In operation 205, the aberration correction apparatus 100 may iteratively perform an aberration removal and a noise removal based on the initialized original image and the first matrix or the second matrix.

The aberration correction apparatus 100 may perform the aberration removal by computing an auxiliary image of a current stage based on an original image of a previous stage. The aberration correction apparatus 100 may perform the aberration removal by computing the auxiliary image of the current stage based on the original image of the previous stage, the observed image, the first matrix, the second matrix, and a first parameter. Here, if the previous stage is an initialization stage, the original image of the previous stage may be the initialized original image. Here, the first parameter is δ of Equation 5.

The aberration correction apparatus 100 may perform the noise removal by computing an original image of the current stage based on the auxiliary image of the current stage. The aberration correction apparatus 100 may perform the noise removal by computing the original image of the current stage based on the auxiliary image of the current stage, the first parameter, a second parameter, and a regularizer. Here, the second parameter is μ of Equation 6.

The aberration correction apparatus 100 may determine whether the original image of the current stage and the original image of the previous stage converge. The aberration correction apparatus 100 may determine whether a difference between the original image of the current stage and the original image of the previous stage is less than a threshold. In response to the difference being less than a threshold, the aberration correction apparatus 100 may terminate the iteratively performing.

In operation 207, the aberration correction apparatus 100 may output a final original image as a result of the iteratively performing. As described above, the aberration correction apparatus 100 may perform an aberration correction more quickly by performing the noise removal in parallel using a MAP, reducing computing resources through reduction of the number of indices of a matrix, and simultaneously implementing vector parallelization through transformation of indices of a matrix indicating an optical aberration of a lens.

Figure 3:
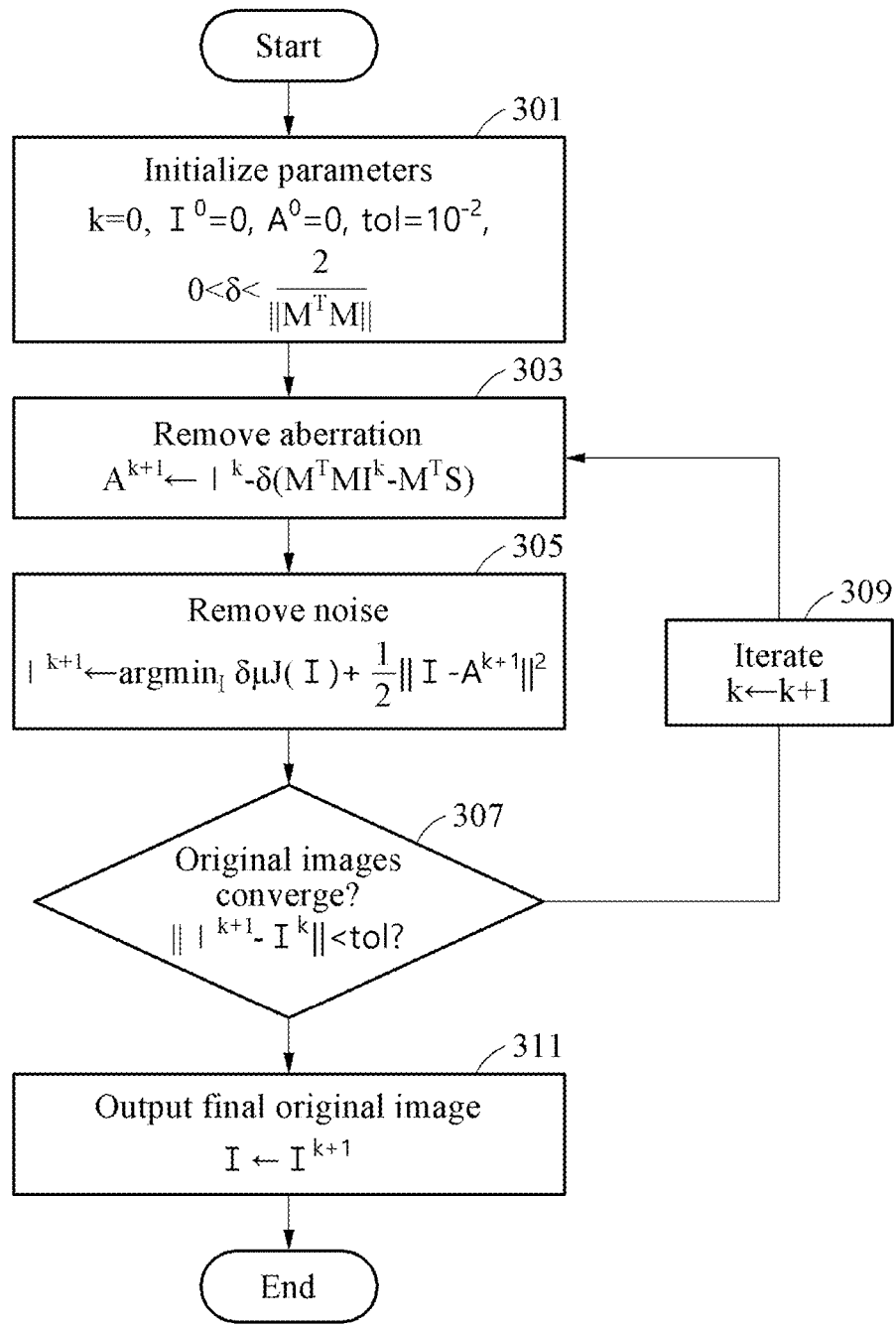
FIG. 3 is a flowchart illustrating an example of an aberration correction method according to an exemplary embodiment.

FIG. 3 is a flowchart illustrating an example of an aberration correction method according to an exemplary embodiment.

Referring to FIG. 3, in operation 301, the aberration correction apparatus 100 may initialize parameters for an aberration correction of an observed image. The aberration correction apparatus 100 may receive an observed image S acquired through an optical device and a 4D matrix P corresponding to information of a PSF of the optical device, and calculate a 4D matrix Q. The aberration correction apparatus 100 may initialize an original image I°.

The aberration correction apparatus 100 may calculate the matrix P and the matrix Q by converting the observed image S acquired through the optical device and the 4D matrix M corresponding to the information of the PSF of the optical device. The aberration correction apparatus 100 may initialize the original image I° of a zeroth stage to a value "0". The aberration correction apparatus 100 may initialize k, indicating an iteration of a stage, to k=0. $|M^TM|$ denotes the greatest singular value of M, and the aberration correction apparatus 100 may determine a parameter δ to "1" in a general situation. The aberration correction apparatus 100 may set a threshold tol for determining whether an algorithm converges. For example, the threshold may be $10^{-2}$.

The aberration correction apparatus 100 may iteratively perform an aberration removal and a noise removal. In operation 303, the aberration correction apparatus 100 performs the aberration removal. The aberration correction apparatus 100 may calculate an auxiliary image $A^{(k+1)}$ based on an original image $I^k$ of a previous stage k, the matrix P, the matrix Q, and the observed image S using Equation 5.

In operation 305, the aberration correction apparatus 100 may perform the noise removal. The aberration correction apparatus 100 may calculate a denoised original image $I^{(k+1)}$ of a current stage k+1 based on the auxiliary image $A^{(k+1)}$ of the current stage using Equation 6. Here, parameters μ and δ may be fixed to predetermined values before an operation.

In operation 307, the aberration correction apparatus 100 may determine whether the original images of adjacent stages converge. The aberration correction apparatus 100 may determine that the original images converge in response to a difference between the original images of the adjacent stages being less than the threshold. The aberration correction apparatus 100 may determine that the original images converge in response to an absolute value of the difference between $I^k$ and $I^{(k+1)}$ being less than the threshold tol.

The aberration correction apparatus 100 may determine whether the original images converge by comparing the stored original image $I^k$ of the previous stage k and the original image $I^{(k+1)}$ of the current stage k+1, and determine whether to terminate the process. In response to a determination that the original images converge, the aberration correction apparatus 100 may output a last updated original image as a final original image, in operation 311. The aberration correction apparatus 100 may output the original image $I^{(k+1)}$ of the current stage k+1 as the final original image. In response to a determination that the original images do not converge, the aberration correction apparatus 100 may add "1" to the iteration k in operation 309, and iteratively perform operations 303 and 305.

Figure 4A:
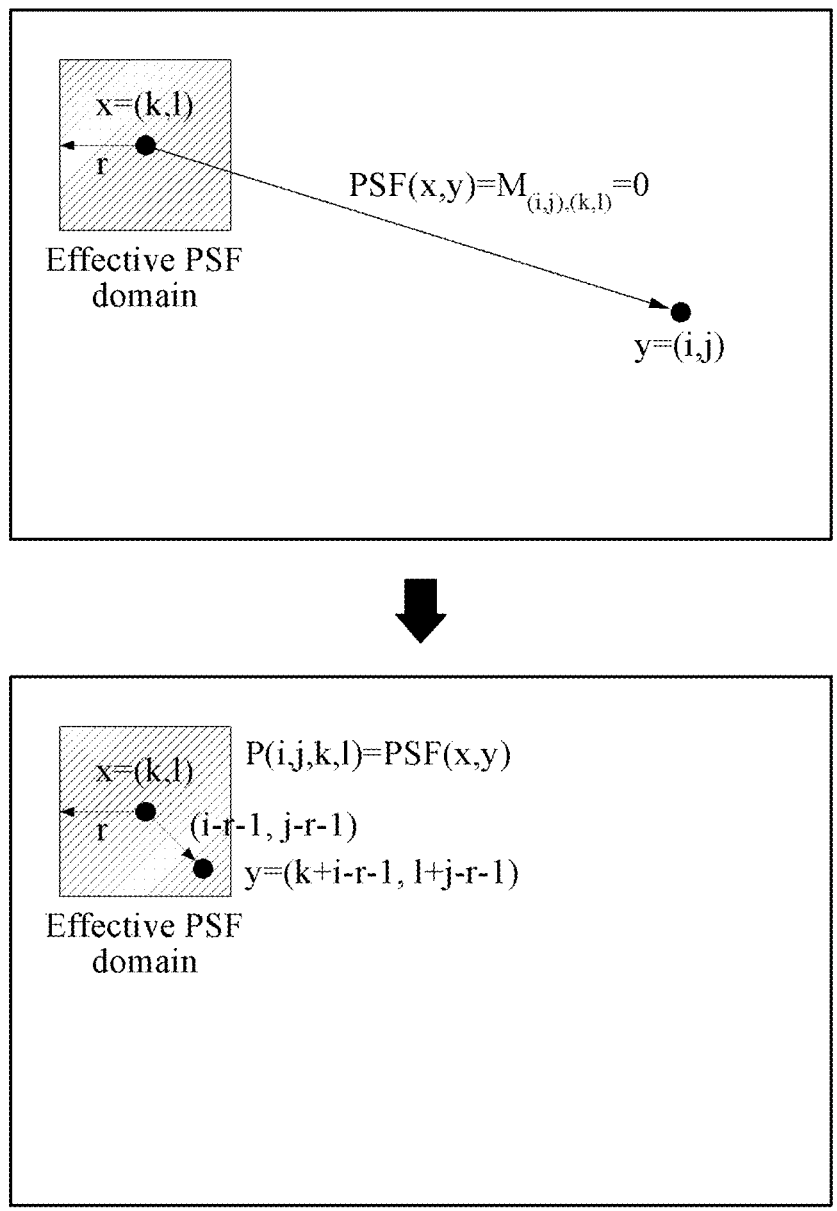
FIG. 4A illustrates an example of comparing a matrix of a point spread function (PSF) to a first matrix or a second matrix including indices reduced using an aberration correction method according to an exemplary embodiment.
Figure 4B:
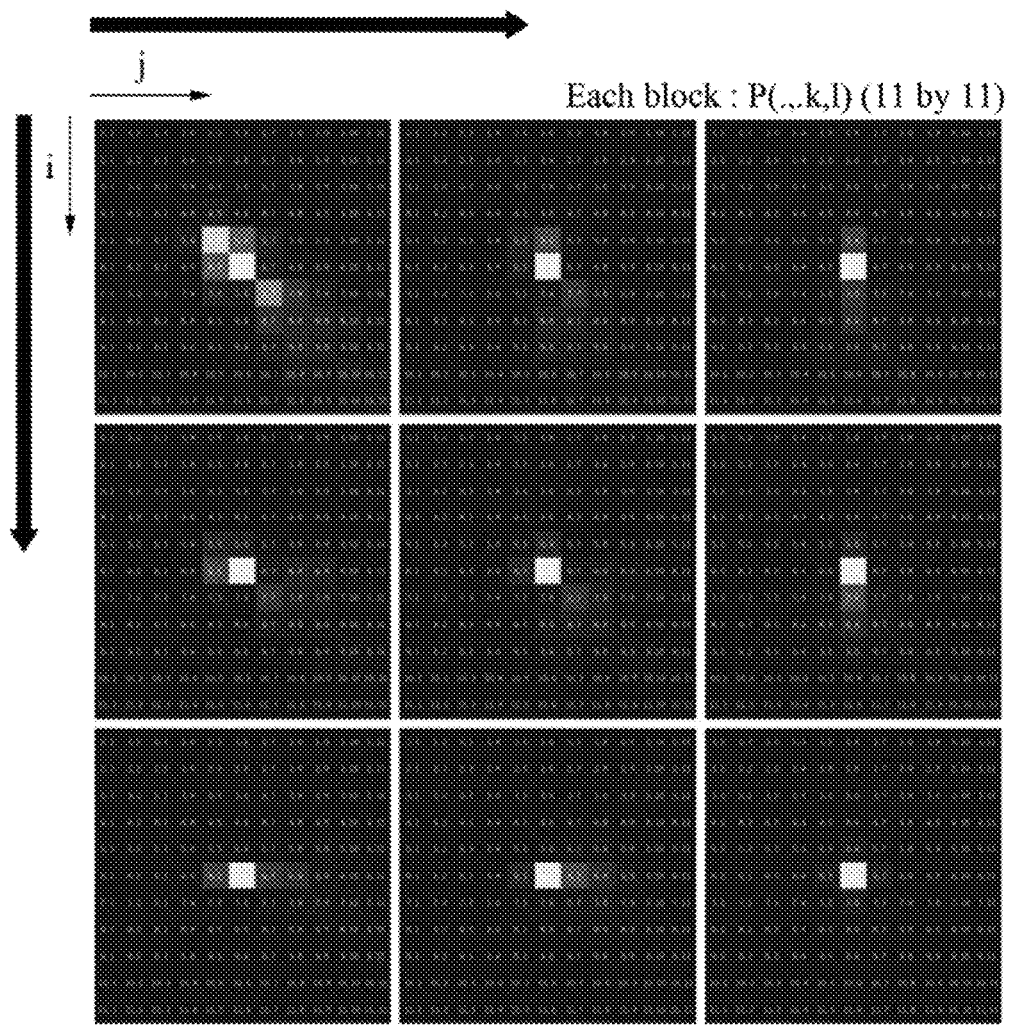
FIG. 4B illustrates an example of information of a PSF stored in a first matrix.

FIG. 4A illustrates an example of comparing a matrix of a PSF to a first matrix or a second matrix including indices reduced using an aberration correction method according to an exemplary embodiment. FIG. 4B illustrates an example of information of a PSF stored in a first matrix.

Referring to FIG. 4A, a matrix M storing information of all PSFs is shown on the top. An intensity of light PSF(x, y) reaching a light arrival point y positioned at (i, j) from a light start point x positioned at (k, l) may have a higher probability of being "0" as a distance between x and y increases, and a region at a distance r from x may be an effective PSF domain. Here, r denotes the maximum distance from x to a point at which the PSF it not "0". The matrix M stores all PSFs including a PSF with respect to y distant from x and thus has the size of $N^4$. y relatively far from x has a value close to "0", and thus the size of M may be unnecessarily great.

A reduced matrix P storing effective information of PSFs is shown on the bottom. A region at which a PSF has a value other than "0" from x is defined as a radius r, and a PSF to a light arrival point y included in such an effective PSF domain is stored in the matrix P. y to which an offset (i−r−1, j−r−1) is applied has coordinates of (k+i−r−1, 1+j−r−1). The matrix P has the size of $(2r+1)^2$. This principle also applies to a matrix Q. Here, the matrix P may be referred to as a first matrix, and the matrix Q may be referred to as a second matrix.

Referring to FIG. 4B, an example of PSF information stored in a first matrix is illustrated. The first matrix may be a 4D matrix, and a slice of (k, l) defined as P(.,.,k,l) includes information of a PSF in an effective PSF domain corresponding to a light start point positioned at (k, l). A matrix included in each slice includes information related to an intensity of light departing from (k, l) and reaching each light arrival point in the effective domain, and an offset (i−r−1, j−1−1) is applied thereto. For example, if r=5, the size of each slice may be 11×11, and the size of a matrix formed by a plurality of slices may be 512×512.

Figure 5A:
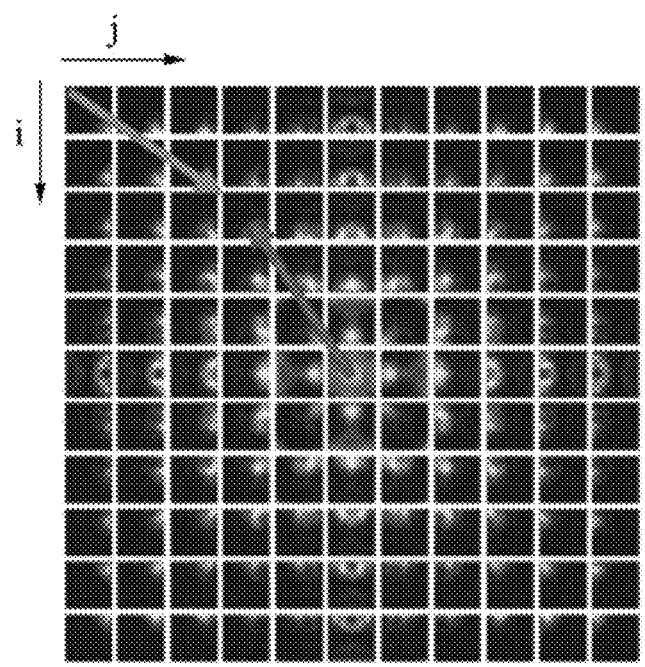
FIG. 5A illustrates an example of a first matrix including indices transformed using an aberration correction method according to an exemplary embodiment.

FIG. 5A illustrates an example of a first matrix including indices transformed using an aberration correction method according to an exemplary embodiment. FIG. 5B illustrates a first matrix including indices transformed using an aberration correction method according to an exemplary embodiment and an example of performing a component-wise product with respect to an original image to which an offset is applied.

Referring to FIG. 5A, an example of PSF information stored in a first matrix including transformed indices is illustrated. The first matrix may be a 4D matrix, and a slice of (i, j) defined as P(i, j,.,.) corresponds to a light arrival point positioned at (i, j). A matrix included in each slice includes information related to an intensity of light corresponding to a light start point from which light reaching (i, j) departs, and an offset (i−r−1, j−1−1) is applied thereto. For example, if r=5, the size of each slice may be 512×512, and the size of a matrix formed by a plurality of slices may be 11×11.

Referring to FIG. 5B, the aberration correction apparatus 100 may perform a component-wise product with respect to an offset image of (i−r−1, j−r−1) and a slice (i, j) based on Equation 8. The size of the slice is N×N, and the size of the offset image is also N×N. Thus, the aberration correction apparatus 100 may perform the component-wise product with respect to each pixel. In this manner, the aberration correction apparatus 100 may perform a component-wise product with respect to a 4D matrix and a vector-parallelized image slice, thereby reducing the computing time of a matrix operation.

Figure 6A:
FIG. 6A illustrates a final original image computed using a conventional aberration correction method.
Figure 6B:
FIG. 6B illustrates a final original image computed using an aberration correction method according to an exemplary embodiment.

FIG. 6A illustrates a final original image computed using a conventional aberration correction method. FIG. 6B illustrates a final original image computed using an aberration correction method according to an exemplary embodiment.

The aberration correction apparatus 100 may use a MAP that maximizes a posteriori probability of an observed value, assuming a distribution of a prior probability for a noise removal left when an aberration removal is performed. Referring to FIG. 6A, the original image computed using a conventional art has a peak signal-to-noise ratio (PSNR) of 28.27. The restored final original image of FIG. 6A includes a lot of noise. On the contrary, referring to FIG. 6B, the original image computed using the aberration correction method has a PSNR of 33.14. The restored final original image of FIG. 6B includes less noise than the restored final original image of FIG. 6A. As described above, the aberration correction method exhibits excellent noise removal performance when compared to the conventional art and thus may restore the original image with better quality.

Figure 7A:
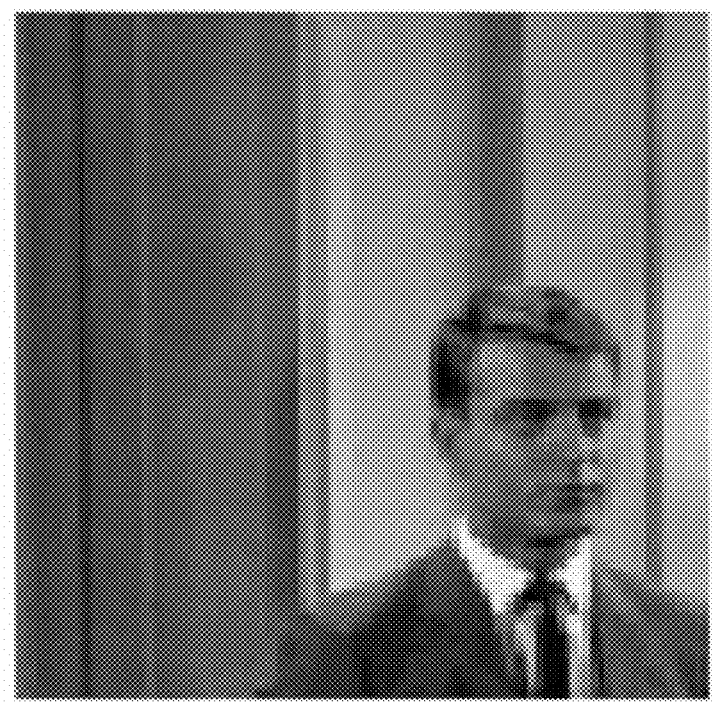
FIG. 7A illustrates a face of a man included in a reference image.
Figure 7B:
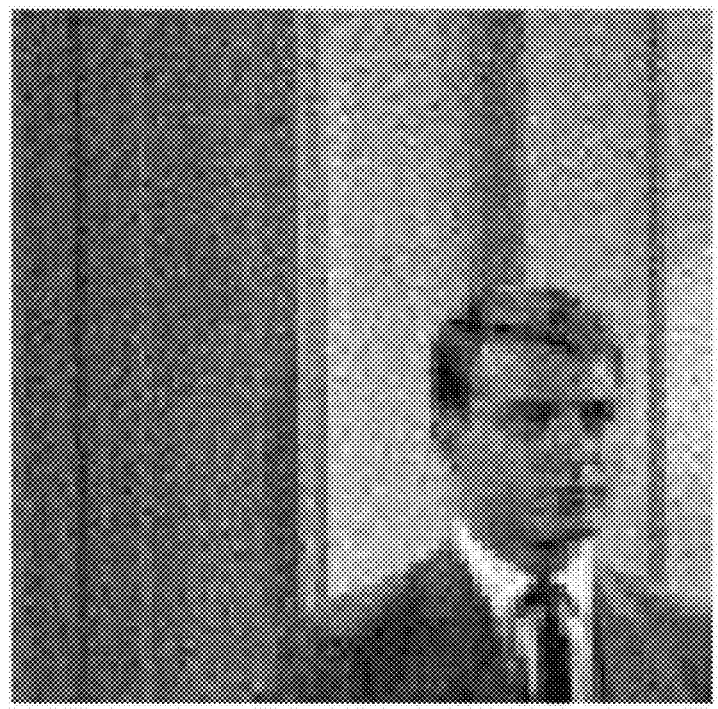
FIG. 7B illustrates a face of a man included in a final original image computed using a conventional aberration correction method.
Figure 7C:
FIG. 7C illustrates a face of a man included in a final original image computed using an aberration correction method according to an exemplary embodiment.
Figure 8A:
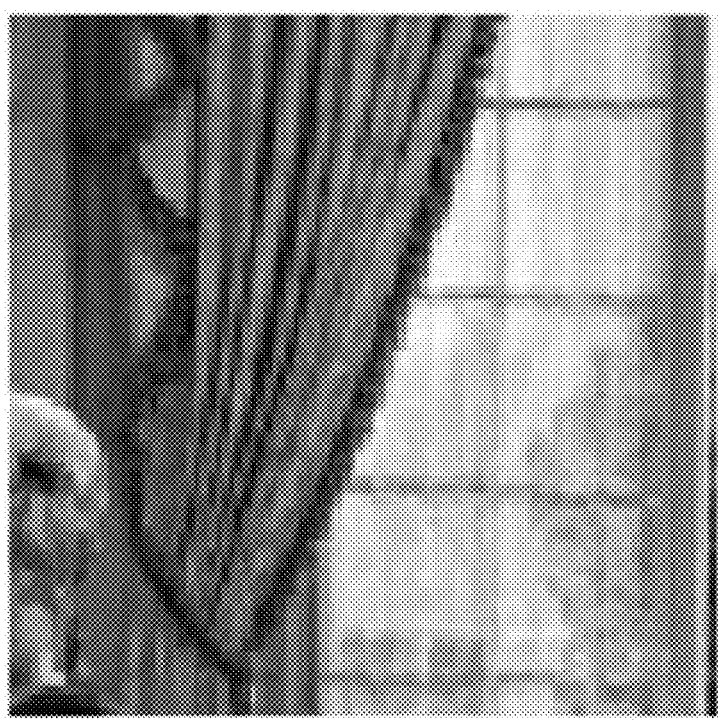
FIG. 8A illustrates curtains included in a reference image.
Figure 8B:
FIG. 8B illustrates curtains included in a final original image computed using a conventional aberration correction method.
Figure 8C:
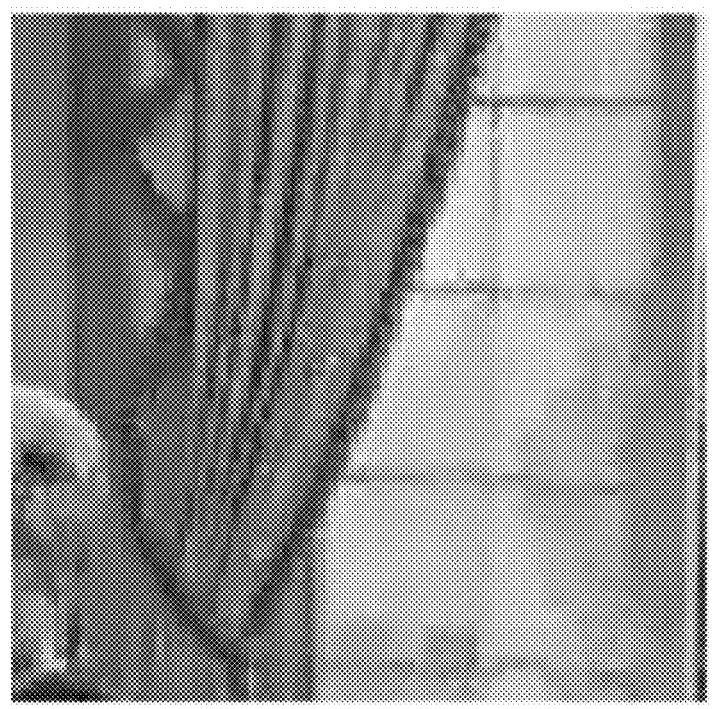
FIG. 8C illustrates curtains included in a final original image computed using an aberration correction method according to an exemplary embodiment.
Figure 9A:
FIG. 9A illustrates legs of a man included in a reference image.
Figure 9B:
FIG. 9B illustrates legs of a man included in a final original image computed using a conventional aberration correction method.
Figure 9C:
FIG. 9C illustrates legs of a man included in a final original image computed using an aberration correction method according to an exemplary embodiment.
Figure 10A:
FIG. 10A illustrates a telephone included in a reference image.
Figure 10B:
FIG. 10B illustrates a telephone included in a final original image computed using a conventional aberration correction method.
Figure 10C:
FIG. 10C illustrates a telephone included in a final original image computed using an aberration correction method according to an exemplary embodiment.

FIG. 7A illustrates a face of a man included in a reference image. FIG. 7B illustrates a face of a man included in a final original image computed using a conventional aberration correction method. FIG. 7C illustrates a face of a man included in a final original image computed using an aberration correction method according to an exemplary embodiment. FIG. 8A illustrates curtains included in the reference image. FIG. 8B illustrates curtains included in the final original image computed using the conventional aberration correction method. FIG. 8C illustrates curtains included in the final original image computed using the aberration correction method according to an exemplary embodiment. FIG. 9A illustrates legs of a man included in the reference image. FIG. 9B illustrates legs of a man included in the final original image computed using the conventional aberration correction method. FIG. 9C illustrates legs of a man included in the final original image computed using the aberration correction method according to an exemplary embodiment. FIG. 10A illustrates a telephone included in the reference image. FIG. 10B illustrates a telephone included in the final original image computed using the conventional aberration correction method. FIG. 10C illustrates a telephone included in the final original image computed using the aberration correction method according to an exemplary embodiment.

The final original image of FIG. 7B restored using the conventional aberration correction method includes more noise than the final original image of FIG. 7C restored using the aberration correction method according to the exemplary embodiment. Further, the image of FIG. 7C is more similar to the image of FIG. 7A than the image of FIG. 7B. That is because the conventional aberration correction method does not consider a noise removal or fails to appropriately reflect the characteristics of an optical device used to capture the image. For example, the polar coordinate system substitution is inappropriate for an aberration correction with respect to an image captured by an optical device without radial symmetry, and the piecewise convolution is inappropriate for an aberration correction with respect to a CEV image.

Similarly, the final original image of FIG. 8C restored using the aberration correction method according to the exemplary embodiment includes less noise than the final original image of FIG. 8B restored using the conventional art based on the actual original image of FIG. 8A, and the image of FIG. 8C is similar to the actual original image. The final original image of FIG. 9C restored using the aberration correction method according to the exemplary embodiment includes less noise than the final original image of FIG. 9B restored using the conventional art based on the actual original image of FIG. 9A, and the image of FIG. 9C is similar to the actual original image. The final original image of FIG. 10C restored using the aberration correction method according to the exemplary embodiment includes less noise than the final original image of FIG. 10B restored using the conventional art based on the actual original image of FIG. 10A, and the image of FIG. 10C is similar to the actual original image. As described above, the aberration correction method according to the exemplary embodiment exhibits excellent performance when compared to the conventional art, irrespective of a position of restoration in an image.

Figure 11:
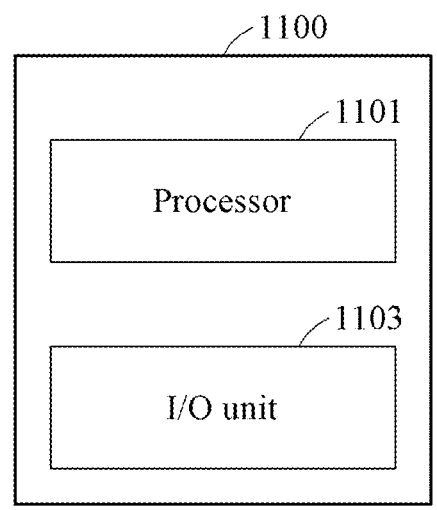
FIG. 11 illustrates a configuration of an aberration correction apparatus according to an exemplary embodiment.

FIG. 11 illustrates a configuration of an aberration correction apparatus according to an exemplary embodiment.

Referring to FIG. 11, an aberration correction apparatus 1100 may include at least one processor 1101 and an input/output (I/O) unit 1103. The aberration correction apparatus 1100 may further include a memory. The memory may store a received observed image and store parameters or algorithms for restoring an original image. The memory may store an auxiliary image and an original image generated in each stage of a process of iteratively performing an aberration removal and a noise removal. The memory may store a final original image.

The I/O unit 1103 may receive the observed image. Here, receiving is a concept including communication between internal devices as well as wired or wireless communication with an external device. The I/O unit 1103 may include, for example, a wireless communication device of a mobile terminal wirelessly connected to an external database. The I/O unit 1103 may include, for example, a wired communication device of a desktop connected to the external database through wires. The I/O unit 1103 may include, for example, an I/O interface connected to an internal memory through wires.

The processor 1101 may generate a first matrix or a second matrix by reducing a matrix of a PSF of a lens included in a capturing device used to capture the observed image and the original image. Here, the first matrix may be a matrix obtained by reducing the number of indices indicating light arrival points of the matrix of the PSF, and the second matrix may be a matrix obtained by reducing the number of indices corresponding to light arrival points of a transposed matrix of the PSF.

The processor 1101 may initialize the original image, calculate a distance from a predetermined light start point to a light arrival point at which an output intensity of light exceeds a threshold, and output the first matrix or the second matrix by reducing the number of indices indicating light arrival points based on the distance and the matrix of the PSF. Data included in the first matrix or the second matrix including the reduced indices may be smaller in size than data of the PSF and thus more effective in terms of storage space and computing time.

The PSF includes values between all light start points and all light arrival points and thus requires a large storage space in the memory. On the contrary, the first matrix and the second matrix each include only information of light arrival points having effective values with respect to respective light start points and thus, require less memory than the PSF. Thus, memory to be allocated may be reduced.

A matrix product of the PSF requires operations with respect to values of all the light arrival points with respect to all the light start points and thus, requires a great deal of computing time. On the contrary, the first matrix and the second matrix includes only information of light arrival points having effective values with respect to light start points. Thus, the processor 1101 may perform a matrix product for an aberration correction in a relatively short time.

The processor 1101 may output a new first matrix or a new second matrix by exchanging the indices indicating the light start points and the indices indicating the light arrival points, with respect to the first matrix or the second matrix including the reduced indices. The first matrix and the second matrix including the exchanged indices may be appropriate for parallel processing and reduce the computing time.

The first matrix and the second matrix before the indices are exchanged may include a great number of indices of light start points and a great number of indices of light arrival points, and a component-wise product for the matrix product operation may be iteratively performed with respect to the indices of the light arrival points with respect to the light start points. The number of indices of light arrival points may be less than the number of indices of light start points, and the number of component-wise product operations that are iteratively performed at the same time may be small. On the contrary, in the first matrix and the second matrix after the indices are exchanged, the number of indices of light start points is less than the number of indices of light arrival points, and the number of component-wise product to be iteratively performed at the same time is greater than that of the former case. Indices of light arrival points of the first matrix or the second matrix including the exchanged indices may be assigned to one or more processors 1101, and faster processing may be enabled by performing parallel processing with respect to a greater number of operations.

The processor 1101 may iteratively perform the aberration removal and the noise removal based on the initialized original image, and the first matrix or the second matrix. The processor 1101 may determine whether an original image of a previous stage and an original image of a current stage converge, for each iteration operation. The processor 1101 may terminate the iteration in response to a determination that the two original images converge.

The processor 1101 may output, as a final original image, the original image calculated as a result of the performing. The final original image may be denoised and thus more similar to the actual original image.

The units described herein may be implemented using hardware components, software components, or a combination thereof. For example, a processing device may be implemented using one or more general-purpose or special purpose computers, such as, for example, a processor, a controller, an arithmetic logic unit, a digital signal processor, a microcomputer, a field programmable array, a programmable logic unit, a microprocessor, any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or semi-permanently in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The method according to the exemplary embodiments described herein may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes embodied herein, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An aberration correction method, comprising:
   receiving a captured image that is captured by a camera;
   generating a first matrix based on a point spread function (PSF) matrix of a lens of the camera by reducing a number of indices indicating light arrival points of the PSF matrix, or generating a second matrix based on the PSF matrix by reducing a number of indices corresponding to light arrival points of a transposed matrix of the PSF matrix;

iteratively performing an aberration removal and a noise removal based on the captured image and the first matrix or the second matrix; and outputting a final corrected image as a result of the iteratively performing the aberration removal and the noise removal.

2. The aberration correction method of claim 1, wherein a PSF of the PSF matrix indicates an output intensity of light reaching a light arrival point with respect to an input intensity of light incident to a light start point, and wherein the generating the first matrix or the second matrix comprises:

calculating a distance from a predetermined light start point to a light arrival point at which an output intensity of light exceeds a threshold; and generating the first matrix or the second matrix by reducing the number of indices indicating the light arrival points based on the distance and the PSF matrix.

3. The aberration correction method of claim 2, wherein the threshold is zero.

4. The aberration correction method of claim 2, wherein the generating the first matrix or the second matrix further comprises outputting a transformed first matrix or a transformed second matrix by exchanging the indices indicating light start points and the indices indicating the light arrival points, with respect to the first matrix or the second matrix.

5. The aberration correction method of claim 1, wherein the iteratively performing comprises:

performing the aberration removal by computing an auxiliary image of a current stage based on a final corrected image of a previous stage;

performing the noise removal by computing an intermediate corrected image of the current stage based on the auxiliary image of the current stage; and determining whether the intermediate corrected image of the current stage and the final corrected image of the previous stage converge.

6. The aberration correction method of claim 5, wherein the performing the aberration removal comprises performing the aberration removal by computing the auxiliary image of the current stage based on the final corrected image of the previous stage, the captured image, the first matrix, the second matrix, and a first parameter.

7. The aberration correction method of claim 5, wherein the performing the noise removal comprises performing the noise removal by computing the intermediate corrected image of the current stage based on the auxiliary image of the current stage, a first parameter, a second parameter, and a regularizer.

8. The aberration correction method of claim 5, wherein the determining comprises whether the intermediate corrected image of the current stage and the final corrected image of the previous stage converge:

determining whether a difference between the intermediate corrected image of the current stage and the final corrected image of the previous stage is less than a threshold; and terminating the iteratively performing in response to the difference being less than the threshold.

9. A non-transitory computer-readable storage medium storing instructions that, when executed by a processor, cause the processor to perform the aberration correction method of claim 1.

10. An aberration correction apparatus, comprising:

at least one processor; and an input/output (I/O) unit, wherein the I/O unit is configured to receive a captured image that is captured by a camera, and the least one processor is configured to:

generate a first matrix based on a point spread function (PSF) matrix of a lens of the camera by reducing a number of indices indicating light arrival points of the PSF matrix, or generate a second matrix based on the PSF matrix by reducing a number of indices corresponding to light arrival points of a transposed matrix of the PSF matrix, iteratively perform an aberration removal and a noise removal based on the captured image, and the first matrix or the second matrix, and output a final original image as a result of the iteratively performing the aberration removal and the noise removal.

11. The aberration correction apparatus of claim 10, wherein a PSF of the PSF indicates an output intensity of light reaching a light arrival point with respect to an input intensity of light incident to a light start point, and wherein the processor is further configured to:

calculate a distance from a predetermined light start point to a light arrival point at which an output intensity of light exceeds a threshold, and generate the first matrix or the second matrix by reducing the number of indices indicating the light arrival points based on the distance and the PSF matrix.

12. The aberration correction apparatus of claim 11, wherein the processor is further configured to output a transformed first matrix or a transformed second matrix by exchanging the indices indicating light start points and the indices indicating the light arrival points, with respect to the first matrix or the second matrix.

* * * * *